(12) United States Patent
Dolph

(10) Patent No.: US 9,438,952 B2
(45) Date of Patent: Sep. 6, 2016

(54) TARGETED MARKETING OVERLAYS FOR DIGITAL VIDEO RECORDERS

(75) Inventor: Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 4129 days.

(21) Appl. No.: 10/803,631

(22) Filed: Mar. 18, 2004

(65) Prior Publication Data

US 2005/0210524 A1 Sep. 22, 2005

(51) Int. Cl.
| | |
|---|---|
| *H04N 9/80* | (2006.01) |
| *H04N 21/44* | (2011.01) |
| *H04N 7/173* | (2011.01) |
| *H04N 21/258* | (2011.01) |
| *H04N 21/2668* | (2011.01) |
| *H04N 21/45* | (2011.01) |
| *H04N 21/6543* | (2011.01) |
| *H04N 21/658* | (2011.01) |
| *H04N 21/81* | (2011.01) |

(52) U.S. Cl.
CPC .... *H04N 21/44016* (2013.01); *H04N 7/17354* (2013.01); *H04N 21/25891* (2013.01); *H04N 21/2668* (2013.01); *H04N 21/4532* (2013.01); *H04N 21/6543* (2013.01); *H04N 21/6582* (2013.01); *H04N 21/812* (2013.01)

(58) Field of Classification Search
USPC .................................................. 386/95, 249
See application file for complete search history.

(56) References Cited

U.S. PATENT DOCUMENTS

| | | | |
|---|---|---|---|
| 5,151,788 A | 9/1992 | Blum | 358/188 |
| 5,548,340 A | 8/1996 | Bertram | 348/559 |
| 5,957,695 A | 9/1999 | Redford et al. | 434/307 |
| 5,999,698 A * | 12/1999 | Nakai | G11B 19/02 348/E5.103 |
| 6,133,910 A * | 10/2000 | Stinebruner | H04N 5/4401 348/731 |
| 6,396,473 B1 | 5/2002 | Callahan et al. | 345/113 |
| 6,477,508 B1 | 11/2002 | Lazar et al. | 705/26 |
| 6,512,551 B1 | 1/2003 | Lund | 348/564 |
| 2001/0013123 A1* | 8/2001 | Freeman et al. | 725/34 |
| 2001/0042018 A1* | 11/2001 | Koga | G06Q 30/02 705/14.69 |
| 2002/0046407 A1* | 4/2002 | Franco | 725/110 |
| 2002/0144262 A1* | 10/2002 | Plotnick | G11B 27/005 725/32 |
| 2003/0194199 A1* | 10/2003 | Roth | 386/46 |

* cited by examiner

*Primary Examiner* — William C Vaughn, Jr.
*Assistant Examiner* — Daniel Tekle
(74) *Attorney, Agent, or Firm* — Yee & Associates, P.C.; Lisa J. Ulrich

(57) ABSTRACT

A method for storing a television program in a Digital Video Recorder (DVR) and modifying the marketing in the television program to the user's location. The software embodiment of the present invention is a Rules Engine located in the DVR. The DVR records the television programming and the Rules Engine sends a program ID and a user ID to the service provider. A service provider program (SPP) receives the program ID and user ID and determines the user's location from the user ID. The SPP acquires local marketing content specific to the user's location based on the user ID and the marketing ID. The SPP sends the local marketing content back to the Rules Engine. The Rules Engine then modifies the marketing in the recorded television programming with the local marketing content and displays the television programming upon user request.

11 Claims, 3 Drawing Sheets

TARGETED MARKETING OVERLAYS FOR DIGITAL VIDEO RECORDERS

FIELD OF THE INVENTION

The present invention is related generally to methods for targeting advertisements and marketing to users and specifically to a method for targeting the marketing contained in the memory of a Digital Video Recorder (DVR) to the user.

BACKGROUND OF THE INVENTION

Advertisers prefer to target their advertising and marketing (collectively hereafter, "marketing") to specific groups of consumers. Advertisers prefer to target their marketing because marketing that is targeted to a specific group of consumers is more effective than mass marketing. When marketing by mail, the location of a consumer can be identified by the consumer's address. The advertiser can define a group of consumers by their state, city, zip code, neighborhood, or any other criteria related to the consumers' addresses. Once the group is defined, the advertiser can then target the marketing to the specific group of consumers. Thus, when marketing by mail, advertisers are able to easily identify specific groups of consumers and modify their marketing to target the specific group of consumers.

Unfortunately, advertisers who market on television have difficulty identifying the location of the consumers. Advertisers are typically limited to defining the group of consumers as the consumers who are within the broadcast range of the television station, which may cover several cities or states. Advertisers would prefer to know the specific location of the consumers so that the advertisers could target their marketing by classifying the groups of consumers by their state, city, or neighborhood. Therefore, a need exists in the art for a method of identifying the location of a plurality of consumers within the broadcast range of a television signal so that advertisers can target their marketing to the consumers.

The invention of digital cable and satellite television has changed the way service providers and consumers use television. Unlike broadcast television which is unilaterally transmitted to the user's television, digital cable and satellite television create a communications path in which data can be transmitted back and forth between the user's television and the service provider. One of the most common tools that uses this communication path is the interactive television programming guide. The interactive television programming guide allows a user to browse the television programming on all channels and at any time into the future. Thus, the user can choose to see the type of programming that is on the television at a particular hour of a particular day. These features are made possible because the cable set-top box, satellite receiver, or Digital Video Recorder (DVR) sends a user ID to the service provider in conjunction with the request for additional data. The service provider acquires the information requested by the user and sends the requested information back to the location associated with the user ID. The user ID is useful because the user ID correlates to a user profile stored at the service provider. Until now, the service provider has been the only party to access the user profile. However, if an advertiser accessed the user profile, then the advertiser could determine the location of the consumer. Therefore, a need exists for a method of identifying the location of a consumer by his user ID so that advertisers can target their marketing to the consumer.

A Digital Video Recorders (DVR) is a device that digitally records television programming for later viewing. A user may also use a DVR to pause live television programming until the user is ready to continue watching the paused television programming. DVRs are well known in the art as evidenced by the DVRs produced under the trademarks TIVO® and REPLAY TV®. When DVRs are used in conjunction with digital cable and satellite, a user can instruct a DVR to record a specific show at specific time. The storage of the television program in the DVR memory creates an opportunity for an advertiser to target the marketing contained in the television program to the user. Therefore, a need exists for a method for modifying the marketing stored in the memory of a DVR so that the marketing can be targeted to a consumer based on the information in the user's profile.

SUMMARY OF THE INVENTION

The present invention, which meets the needs identified above, is a method for storing a television program in a Digital Video Recorder (DVR) and customizing the marketing in the television program to the user. The software embodiment of the present invention is a Rules Engine located in the DVR. The DVR records the television programming and the Rules Engine sends a program ID and a user ID to the service provider. A service provider program (SPP) receives the program ID and user ID and uses the user ID to determine the user's location from a user profile. The SPP acquires local marketing content specific to the user based on the user's location and the program ID. Local marketing content options include add-on marketing, overlay marketing, and replacement marketing. The SPP then sends the local marketing content back to the Rules Engine in the DVR. If the SPP does not have any local marketing content for the user, then the SPP sends a message to the Rules Engine indicating that there is no local marketing content. The Rules Engine then modifies the marketing in the recorded television program with the local marketing content and displays the television program containing the modified marketing upon user request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "add-on marketing" shall mean local marketing content that is displayed in addition to original marketing, either before or after the original marketing.

As used herein, the term "computer" shall mean a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, the term "Digital Video Recorder (DVR)" shall mean a machine that receives television programming and stores the television programming in memory or on a disk. The DVR may be integrated into a cable set-top box, a satellite receiver, or the television.

As used herein, the term "local marketing content" shall mean marketing that is targeted to a group of people in a specific area, such as a city, zip code, or area code. Local marketing content includes add-on marketing, overlay marketing, and replacement marketing.

As used herein, the term "marketing" shall mean an activity that attracts peoples' attention to a specific concept, service, or product.

As used herein, the term "modified marketing" shall mean marketing that was original marketing, but has been modified using local marketing content.

As used herein, the term "original marketing" shall mean the marketing that an advertiser or service provider inserts into television programming As used herein, the term "overlay marketing" shall mean local marketing content that is placed over original marketing.

As used herein, the term "program ID" shall mean a unique number that identifies a specific advertisement, marketing program, or commercial.

As used herein, the term "replacement marketing" shall mean local marketing content that replaces the original marketing content.

As used herein, the term "service provider" shall mean a person or organization that transmits television programming and marketing to a plurality of users.

As used herein, the term "television programming" shall mean the programs, shows, and marketing that a service provider transmits to a plurality of users.

As used herein, the term "user ID" shall mean a unique number that identifies a specific person, organization, group, or household.

Figure 1:
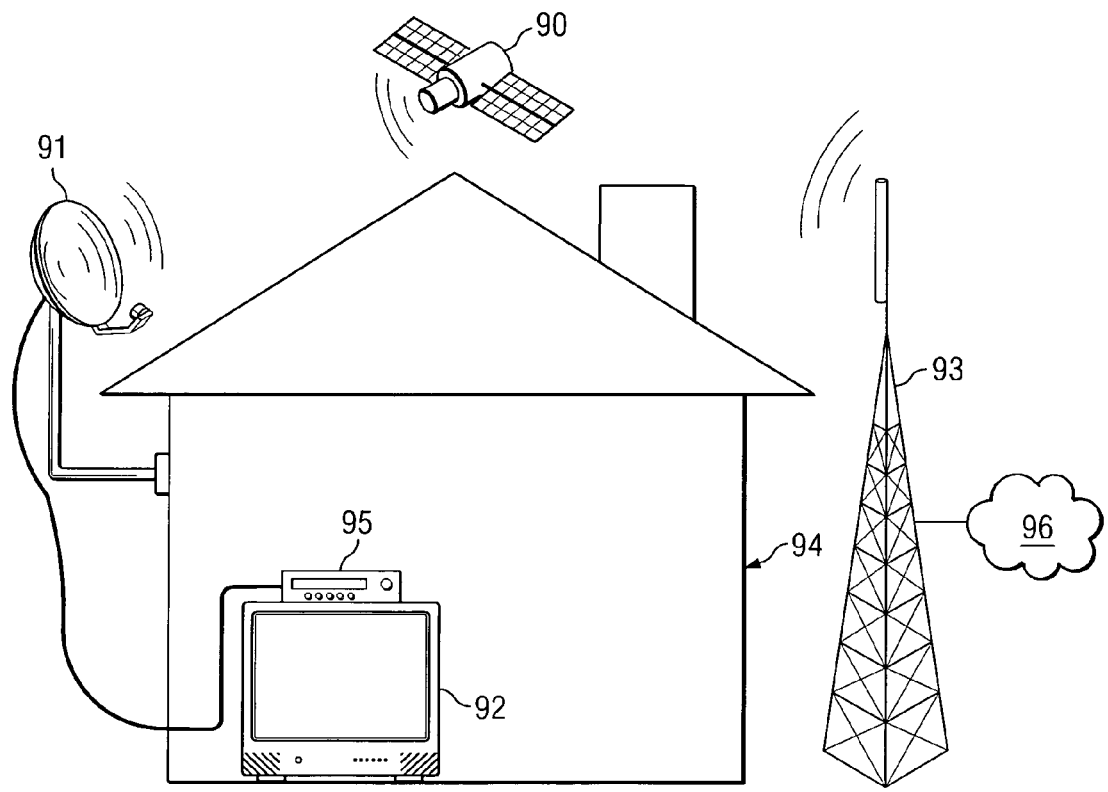
FIG. 1 is an illustration of the communications paths of the present invention.

FIG. 1 is an illustration of the communications network of the present invention. Television programming originates at service provider computer 96 and is broadcast to satellite 90 via tower 93. Satellite 90 transmits the television programming to satellite dish 91. Satellite dish 91 relays the television programming to the users' home 94 and into Digital Video Recorder (DVR) 95. DVR 95 records the television programming in memory or on a disk and displays the television programming on television 92. The embodiment depicted in FIG. 1 is only one embodiment of a communications network that transmits televisions programming to DVR 95 and television 92, and is not meant as an architectural limitation. Persons of ordinary skill in the art will appreciate that other communications networks may exists such as analog and digital cable TV (CATV) communications networks, broadcast television communications networks, and the Internet.

Figure 2:
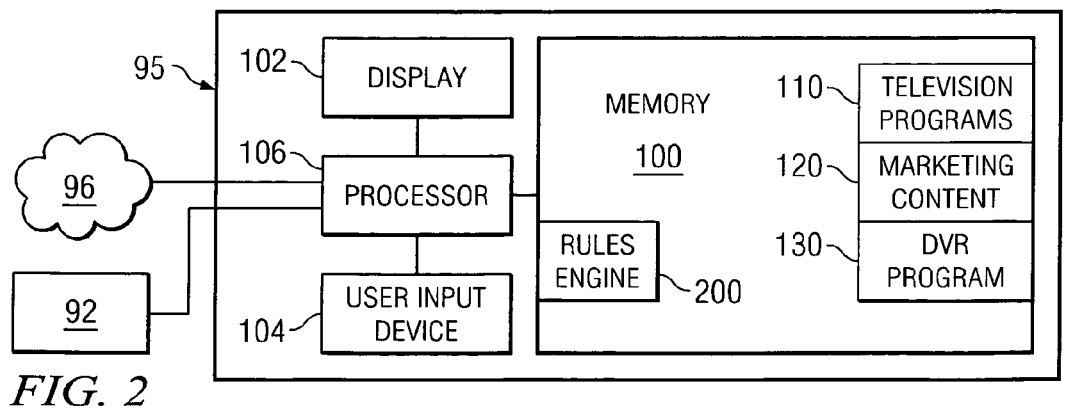
FIG. 2 is an illustration of the Digital Video Recorder (DVR) of the present invention.

The internal configuration of a DVR, including connection and orientation of the processor, memory, and input/output devices, is well known in the art. The present invention may be a method, a stand alone DVR program, or a plug-in to an existing DVR program. Persons of ordinary skill in the art are aware of how to configure DVR programs, such as those described herein, to plug into an existing DVR program. Referring to FIG. 2, the methodology of the present invention is implemented on software by Rules Engine 200. Rules Engine 200 is stored in memory 100. Alternatively, Rules Engine 200 can be stored in an external storage device such as a removable disk, a CD-ROM, or a USB storage device. Memory 100 also contains television programs 110, marketing content 120, and DVR program 130. The present invention may interface with Rules Engine 200, television programs 110, marketing content 120, and DVR program 130 through memory 100.

Rules Engine 200 is the software program that requests targeting marketing from service provider computer 96 and modifies the original marketing with any local marketing content received from service provider computer 96. Television programs 110 are the television programming sent from service provider computer 96 that has been recorded and stored in memory 100 or on a disk. Marketing content 120 is the marketing content sent from service provider computer 96 that has been recorded and stored in memory 100 or on a disk. DVR program 130 is the software program that DVR 95 uses to receive, record, store, and display the television programming and marketing content.

As part of the present invention, memory 100 can be configured with Rules Engine 200, television programs 110, marketing content 120, and/or DVR program 130. Processor 106 can execute the instructions contained in Rules Engine 200, television programs 110, marketing content 120, and/or DVR program 130. Processor 106 is also able to display data on display 102 and accept user input on user input device 104. Processor 106 and memory 100 are part of a DVR such as DVR 95 depicted in FIG. 1. Processor 106 can communicate with service provider computer 96 and television 92 via the communications network depicted in FIG. 1.

Figure 3:
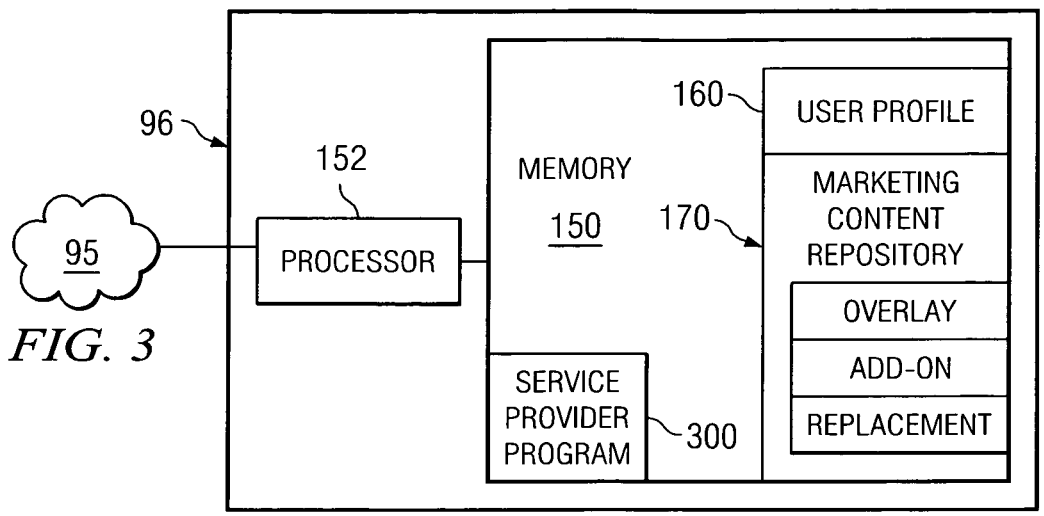
FIG. 3 is an illustration of the service provider computer of the present invention.

The internal configuration of a computer, including connection and orientation of the processor, memory, and input/output devices, is also well known in the art. The present invention may be a method, a stand alone computer program, or a plug-in to an existing computer program. Persons of ordinary skill in the art are aware of how to configure computer programs, such as those described herein, to plug into an existing computer program. Referring to FIG. 3, the methodology of the present invention is implemented on software by Service Provider Program (SPP) 300. SPP 300 is stored in memory 150. Alternatively, SPP 300 can be stored in an external storage device such as a removable disk, a CD-ROM, or a USB storage device. Memory 150 also contains user profile 160 and marketing content repository 170. The present invention may interface with SPP 300, user profile 160, and marketing content repository 170 through memory 150.

SPP 300 is a software program that receives requests from DVR 95 for local marketing content, obtains the local marketing content, and transmits the local marketing content back to DVR 95. User profile 160 is a database of the personal information for the service provider's subscribers. The subscribers' personal information comprises the subscribers' names, addresses, cities, states, and zip codes. Persons of ordinary skill in the art are aware of other personal information that may be stored in user profile 160. Marketing content repository 170 is a database or computer file containing the local marketing content. Marketing content repository 170 includes overlay marketing, add-on marketing, and replacement marketing. An example of add-on marketing would be an advertisement promoting a special offer for a local branch of a nationwide retailer which is displayed after a nationwide retailer advertisement. An example of overlay marketing would be a map from the user's house to a retail dealer of the advertised goods or services. Overlay marketing can also be the local incentives offered on products when a nationwide advertisement is displayed. Overlay marketing can include images, animation, or text. An example of replacement marketing would be a local advertisement that replaces a nationwide advertisement.

As part of the present invention, memory 150 can be configured with SPP 300, user profile 160, and/or marketing content repository 170. Processor 152 can execute the instructions contained in SPP 300, user profile 160, and/or marketing content repository 170. Processor 152 and memory 150 are part of a computer such as service provider computer 96 in FIG. 1. Processor 152 can communicate with DVR 95 via the communications network depicted in FIG. 1.

In alternative embodiments, SPP 300, user profile 160, and/or marketing content repository 170 can be stored in the memory of other computers. Storing SPP 300, user profile 160, and/or marketing content repository 170 in the memory of other computers allows the processor workload to be distributed across a plurality of processors instead of a single processor. Further configurations of SPP 300, user profile 160, and/or marketing content repository 170 across various memories, such as client memory and server memory, are known by persons of ordinary skill in the art.

Figure 4:
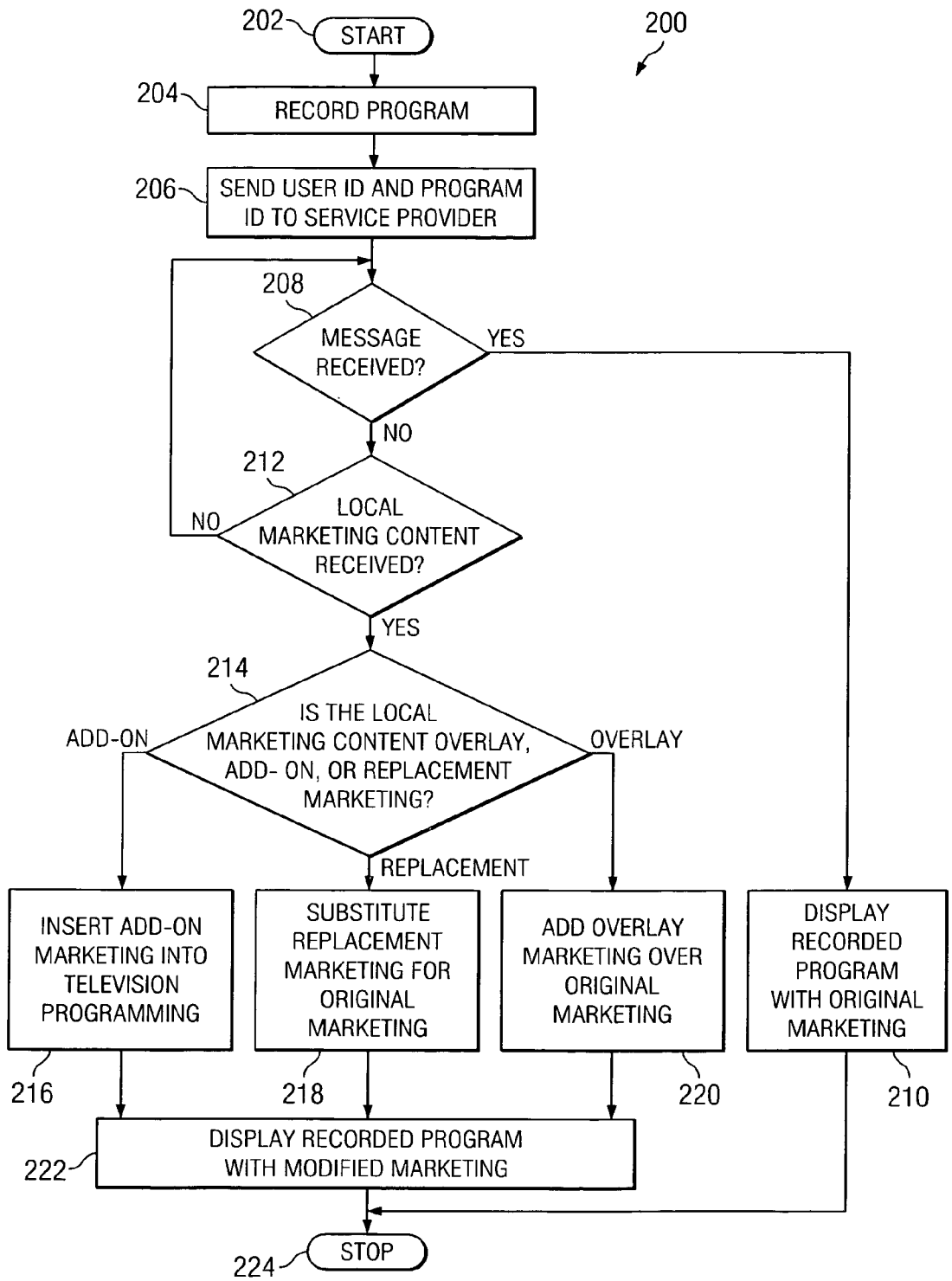
FIG. 4 is an illustration of the logic of the Rules Engine of the present invention.

FIG. 4 is an illustration of the logic of Rules Engine 200 of the present invention. Rules Engine 200 is a program that obtains local marketing from service provider computer 96, modifies the original marketing with the local marketing content, and displays the modified marketing along with the television programming. Rules Engine 200 starts (202) when the user instructs DVR 95 to record a television program. Rules Engine 200 records the television program per the user's instructions (204). Rules Engine 200 then sends the user ID and the program ID to the service provider (206). The user ID is a number or code that identifies the user and may be the user's account number. The program ID is a number or code that identifies a specific advertisement, commercial, or television program. Rules Engine 200 then waits for a response from service provider computer 96.

At step 208, Rules Engine 200 determines if Rules Engine 200 has received a message indicating that there is no local marketing content for the recorded television programming (208). If Rules Engine 200 received a message indicating that there is no local marketing content for the recorded television programming, then Rules Engine 200 displays the recorded television programming with the original marketing when prompted by the user (210). Rules Engine 200 then ends (224). If Rules Engine 200 has not received a message indicating that there is no local marketing content for the recorded television programming, then Rules Engine 200 determines if Rules Engine 200 has received local marketing content from service provider computer 96 (212). If Rules Engine 200 has not received local marketing content from service provider computer 96, then Rules Engine 200 returns to step 208. If Rules Engine 200 has received local marketing content from service provider computer 96, then Rules Engine 200 proceeds to step 214.

At step 214, Rules Engine 200 determines if the local marketing content is overlay, add-on, or replacement marketing (214). If Rules Engine 200 determines that the local marketing is add-on marketing, then Rules Engine 200 inserts the add-on marketing into the television program per the instructions in the add-on marketing (216), and proceeds to step 222. If Rules Engine 200 determines that the local marketing is replacement marketing, then Rules Engine 200 substitutes the replacement marketing for the original marketing in the television programming (218), and proceeds to step 222. If Rules Engine 200 determines that the local marketing is overlay marketing, then Rules Engine 200 places the overlay marketing over the original marketing in the television programming (220), and proceeds to step 222. At step 222, Rules Engine 200 displays the recorded television programming with the modified marketing when prompted by the user (222). Rules Engine 200 then ends (224).

Figure 5:
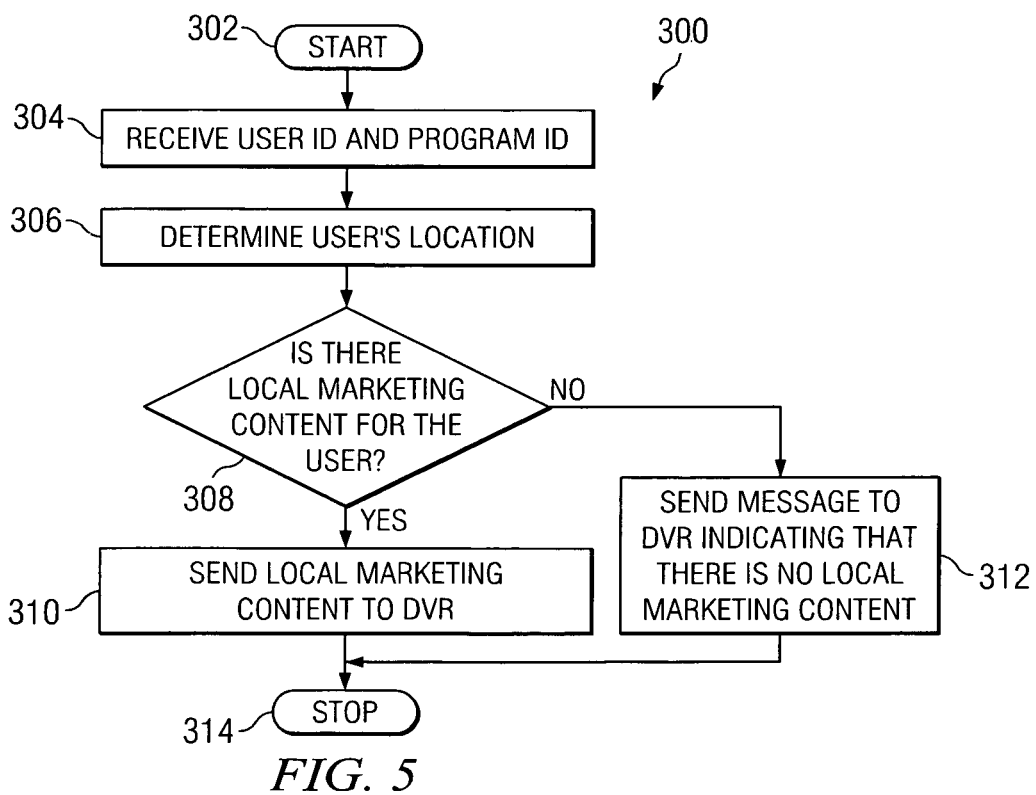
FIG. 5 is an illustration of the logic of the Service Provider Program (SPP) of the present invention.

FIG. 5 is an illustration of the logic of Service Provider Program (SPP) 300. SPP 300 is a computer program that acquires the local marketing content that Rules Engine 200 requested, and sends the local marketing content back to Rules Engine 200. SPP 300 starts (302) when the service provider broadcasts television programming to the subscribers. SPP 300 receives the user ID and the program ID from Rules Engine 200 (304). SPP 300 then determines the user's location from the user ID (306). SPP 300 may determine the user's location by referencing the user profile associated with the user ID and determining the user's location including the user's address, zip code, or telephone number. The user profile may be like user profile 160 depicted in FIG. 3.

SPP 300 then determines whether there is local marketing content associated with the user's location (308). If SPP 300 determines that there is local marketing content associated with the user, then SPP 300 acquires the local marketing content from the marketing content repository and sends the local marketing content to DVR 95 (310). The marketing content repository may be like marketing content repository 170 depicted in FIG. 3. In acquiring the local marketing content, SPP 300 acquires the local marketing content for the user's location that relates to the marketing identified by the program ID. In other words, SPP 300 acquires the local marketing content only for the user's location and only for the marketing that the user has recorded on DVR 95. If SPP 300 determines that there is local marketing content associated with the user's location, then SPP 300 sends a message to DVR 95 indicating that there is no local marketing content associated with the user's location (312). SPP 300 then ends (314).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for sending second marketing content to a digital video recorder, the method comprising the steps of:
   a computer broadcasting, from a service provider to the digital video recorder via a communications network, television programming comprising first marketing content;
   after the step of the computer broadcasting the television programming, the computer receiving a user identification and a program identification from the digital video recorder;

the computer determining a location of the user by referencing a user profile associated with the user identification;

in response to the step of the computer determining the location of the user, the computer determining whether the second marketing content exists for the television programming based on the program identification and the user profile;

in response to the step of the computer determining that the second marketing content exists, the computer sending the second marketing content to the digital video recorder, wherein the second marketing content is associated with the location of the user and the program identification;

the computer determining whether a message indicating that no second marketing content exists for the television programming has been received; and in response to the step of the computer determining that a message indicating that no second marketing content exists for the television programming has been received, the computer displaying the television programming with the first marketing content.

2. The method of claim 1, wherein the second marketing content is add-on marketing content comprising instructions for inserting the add-on marketing content into the television programming.

3. A method for modifying first marketing content stored within a computer-readable memory of a digital video recorder, the method comprising the steps of:

a computer receiving, via a communications network, television programming comprising the first marketing content;

the computer storing the television programming in the computer-readable memory;

in response to the step of the computer storing the television programming, the computer sending a user identification and a program identification to a service provider;

in response to the step of the computer sending the user identification and the program identification to the service provider, wherein the service provider determines a location of a user by referencing a user profile associated with the user identification and determines whether a second marketing content exists for the television programming based on the program identification and the user profile, the computer determining whether a message indicating that no second marketing content exists for the television programming has been received;

in response to the step of the computer determining that the message indicating that no second marketing content exists for the television programming has been received, displaying the television programming with the first marketing content;

in response to the step of the computer determining that the message indicating that no second marketing content exists for the television programming has not been received the computer receiving, from the service provider, the second marketing content that is associated with the program identification and with one of an address of a user, a zip code of the user, and a telephone number of the user;

in response to the step of the computer receiving the second marketing content from the service provider, the computer determining whether the second marketing content is add-on marketing content;

in response to the step of determining that the second marketing content is add-on marketing content, the computer inserting the add-on marketing content into the television programming per instructions in the add-on marketing content; and sending the television programming including the second marketing content to the computer-readable memory of the digital video recorder.

4. A computer system for modifying first marketing content stored within a computer-readable memory of a digital video recorder, the computer system comprising:

one or more processors, one or more computer-readable memories and one or more computer-readable tangible storage devices;

program instructions, stored on at least one of the one or more storage devices for execution by at least one of the one or more processors via at least one of the one or more computer-readable memories, to receive, via a communications network, television programming comprising the first marketing content;

program instructions, stored on at least one of the one or more storage devices for execution by at least one of the one or more processors via at least one of the one or more computer-readable memories, to store the television programming in the computer-readable memory of the digital video recorder;

program instructions, stored on at least one of the one or more storage devices for execution by at least one of the one or more processors via at least one of the one or more computer-readable memories, responsive to storing the television programming in the computer-readable memory of the digital video recorder to send a user identification and a program identification to a service provider, wherein the service provider determines whether a second marketing content exists for the television programming based on the program identification and a user profile associated with the user identification;

program instructions, stored on at least one of the one or more storage devices for execution by at least one of the one or more processors via at least one of the one or more computer-readable memories, to determine whether a message indicating that no second marketing content exists for the television programming has been received;

program instructions, stored on at least one of the one or more storage devices for execution by at least one of the one or more processors via at least one of the one or more computer-readable memories, responsive to a determination that the message indicating that no second marketing content exists for the television programming has been received, to display the television programming with the first marketing content;

program instructions, stored on at least one of the one or more storage devices for execution by at least one of the one or more processors via at least one of the one or more computer-readable memories, responsive to sending the user identification and the program identification to the service provider, and the service provider determining the second marketing content exists and sending the second marketing content to the digital video recorder, to receive, from the service provider, the second marketing content associated with a location of a user and the program identification;

program instructions, stored on at least one of the one or more storage devices for execution by at least one of the one or more processors via at least one of the one or more computer-readable memories, to modify the television programming with the second marketing content; and program instructions, stored on at least one of the one or more storage devices for execution by at least one of the one or more processors via at least one of the one or more computer-readable memories, responsive to a user request and after modifying the television programming with the second marketing content, to display the television programming.

5. The computer system of claim 4 further comprising:

program instructions, stored on at least one of the one or more storage devices for execution by at least one of the one or more processors via at least one of the one or more computer-readable memories, responsive to receiving the second marketing content, to determine whether the second marketing content is add-on marketing content;

wherein the program instructions to modify the television programming with the second marketing content, responsive to determining that the second marketing content is the add-on marketing content, add the add-on marketing content into the television programming per instructions in the add-on marketing content.

6. The computer system of claim 4 further comprising:

program instructions, stored on at least one of the one or more storage devices for execution by at least one of the one or more processors via at least one of the one or more computer-readable memories, responsive to receiving the second marketing content, to determine whether the second marketing content is replacement marketing content;

wherein the program instructions to modify the television programming with the second marketing content, responsive to determining that the second marketing content is the replacement marketing content, replace the first marketing content with the replacement marketing content.

7. The computer system of claim 4 further comprising:

program instructions, stored on at least one of the one or more storage devices for execution by at least one of the one or more processors via at least one of the one or more computer-readable memories, responsive to receiving the second marketing content, to determine whether the second marketing content is overlay marketing content;

wherein the program instructions to modify the television programming with the second marketing content, responsive to determining that the second marketing content is the overlay marketing content, place the overlay marketing content over the first marketing content.

8. A computer system for sending second marketing content to a digital video recorder, the computer system comprising:

one or more processors, one or more computer-readable memories and one or more computer-readable tangible storage devices;

program instructions, stored on at least one of the one or more storage devices for execution by at least one of the one or more processors via at least one of the one or more computer-readable memories, to broadcast, from a service provider to the digital video recorder via a communications network, television programming comprising first marketing content;

program instructions, stored on at least one of the one or more storage devices for execution by at least one of the one or more processors via at least one of the one or more computer-readable memories, to, after broadcasting the television programming, receive a user identification and a program identification from the digital video recorder;

program instructions, stored on at least one of the one or more storage devices for execution by at least one of the one or more processors via at least one of the one or more computer readable memories, to determine a location of a user by referencing a user profile associated with the user identification;

program instructions, stored on at least one of the one or more storage devices for execution by at least one of the one or more processors via at least one of the one or more computer readable memories, to determine whether the second marketing content exists for the television programming based on the program identification and the user profile;

program instructions, stored on at least one of the one or more storage devices for execution by at least one of the one or more processors via at least one of the one or more computer readable memories, responsive to determining that the second marketing content exists to send the second marketing content to the digital video recorder;

program instructions, stored on at least one of the one or more storage devices for execution by at least one of the one or more processors via at least one of the one or more computer readable memories, responsive to determining that the second marketing content does not exist, to send a message to the digital video recorder indicating that there is no second marketing content;

program instructions, stored on at least one of the one or more storage devices for execution by at least one of the one or more processors via at least one of the one or more computer-readable memories, to determine whether a message indicating that no second marketing content exists for the television programming has been received; and program instructions, stored on at least one of the one or more storage devices for execution by at least one of the one or more processors via at least one of the one or more computer-readable memories, responsive to a determination that the message indicating that no second marketing content exists for the television programming has been received, to display the television programming with the first marketing content.

9. A computer system comprising one or more processors, one or more computer-readable memories, one or more non-transitory computer-readable mediums and program instructions which are stored on the one or more non-transitory computer-readable mediums for execution by the one or more processors via the one or more memories and when executed by the one or more processors perform the method of claim 1.

10. A computer system comprising one or more processors, one or more computer-readable memories, one or more non-transitory computer-readable mediums and program instructions which are stored on the one or more non-transitory computer-readable mediums for execution by the one or more processors via the one or more memories and when executed by the one or more processors perform the method of claim 3.

11. The computer system of claim 8, wherein the second marketing content is add-on marketing content comprising instructions for inserting the add-on marketing content into the television programming.

* * * * *